US00RE33794E

United States Patent [19]

King et al.

[11] E Patent Number: Re. 33,794

[45] Reissued Date of Patent: Jan. 14, 1992

[54] COMBINATION GARMENT BAG AND PACKING CASE LUGGAGE ARTICLE

[75] Inventors: William L. King, Denver, Colo.; Charles K. Weisbart, Neenah, Wis.

[73] Assignee: Samsonite Corporation, Denver, Colo.

[21] Appl. No.: 367,382

[22] Filed: Jun. 16, 1989

Related U.S. Patent Documents

Reissue of:

[64] Patent No.: 4,693,368
Issued: Sep. 15, 1987
Appl. No.: 830,995
Filed: Feb. 19, 1986

[51] Int. Cl.[5] ..... A45C 3/00; A45C 5/12; A45C 13/26; A45C 13/34

[52] U.S. Cl. ..... 206/287.1; 206/289; 206/292; 190/13 C; 190/36; 190/111; 190/112

[58] Field of Search ..... 206/278, 287, 287.1, 206/292, 293; 190/13 R, 37, 110, 112, 108, 109; D3/71, 76, 77; 24/30.5, 265 AL, 265 H, 698; 292/253, 341.18, DIG. 48

[56] References Cited

U.S. PATENT DOCUMENTS

| | | | |
|---|---|---|---|
| D. 177,591 | 5/1956 | Robinson | D3/71 |
| D. 267,677 | 1/1983 | Pelavin | 206/287.1 X |
| D. 277,431 | 2/1985 | Bomes et al. | D3/77 X |
| 730,400 | 6/1903 | Rasch | 24/265 H |
| 1,150,057 | 8/1915 | O'Neill | 190/109 |
| 1,292,493 | 1/1919 | Logan | 206/279 |
| 1,438,737 | 12/1922 | Witbeck | 206/293 X |
| 1,562,417 | 11/1925 | Schuck | 206/289 X |
| 1,796,961 | 3/1931 | Ritter, Jr. | 206/292 |
| 1,823,403 | 9/1931 | Krueger | 206/289 X |
| 1,827,542 | 10/1931 | Ritter, Jr. | 190/109 X |
| 1,844,336 | 2/1932 | Ritter, Jr. | 206/289 |
| 2,003,100 | 5/1935 | Arpin | 206/287.1 X |
| 2,154,630 | 4/1939 | Marbury et al. | 206/287.1 X |
| 2,325,806 | 8/1943 | Simmons | 206/287.1 |
| 2,370,492 | 2/1945 | Russell | 206/287.1 X |
| 2,423,297 | 7/1947 | Creamer | 206/287.1 X |
| 2,453,663 | 11/1948 | Hinson | 206/287.1 X |
| 2,496,128 | 1/1950 | Lifton | 206/287.1 X |
| 2,533,333 | 12/1950 | Kitson | 190/111 |
| 2,552,438 | 5/1951 | Kramer | 190/111 |
| 2,637,424 | 5/1953 | Duskin | 190/112 X |
| 2,673,756 | 3/1954 | Axtell | 190/109 X |
| 2,695,085 | 11/1954 | Ritter, Jr. | 206/287.1 X |
| 2,774,450 | 12/1956 | Smallberg | 190/109 X |
| 3,115,959 | 12/1963 | Jaffe | 206/287.1 |
| 3,126,076 | 3/1964 | Koffler | 206/287.1 |

(List continued on next page.)

FOREIGN PATENT DOCUMENTS

| | | | |
|---|---|---|---|
| 629153 | 10/1961 | Canada | 190/115 |
| 2269311 | 11/1975 | France | 24/265 H |

*Primary Examiner*—Sue A. Weaver
*Attorney, Agent, or Firm*—Gregory W. O'Connor

[57] ABSTRACT

An article of luggage includes a garment bag enclosure and a packing case enclosure which advantageously cooperate with one another in a transportation state or condition and a use state or condition. The packing case enclosure is preferably connected to an inner panel of the garment bag enclosure. In the transportation condition, the garment bag enclosure folds over the top of the packing case enclosure and the luggage article is easily transported by carrying devices attached preferably to the exterior panel of the garment bag enclosure. In the use orientation, the interior panel of the garment bag enclosure is disconnected, and the packing case enclosure moves or pivots outward to an extended orientation. A divider panel provides access to the interior of the packing case enclosure while access to the garment bag enclosure is simultaneously available as a result of the detachment of the interior panel. In the use condition in which the packing case enclosure is in the extended orientation, the luggage article can be used to house garments on hangers and other smaller items within the packing case enclosure, thereby avoiding the necessity for unpacking and repacking the luggage article.

56 Claims, 4 Drawing Sheets

U.S. PATENT DOCUMENTS

| | | | |
|---|---|---|---|
| 3,164,231 | 1/1965 | Kryznoski | 206/292 |
| 3,221,848 | 12/1965 | O'Neil | 206/287.1 X |
| 3,273,678 | 9/1966 | Koret | 206/287 X |
| 3,291,266 | 12/1966 | Komroff | 190/113 X |
| 3,299,997 | 1/1967 | Herz | 206/287.1 |
| 3,437,181 | 4/1969 | Blount, Jr. | 206/287.1 X |
| 3,447,649 | 6/1969 | Kish, Jr. | 190/111 |
| 3,542,170 | 11/1970 | Bialo | 206/279 |
| 3,729,038 | 4/1973 | Ekeson | 190/110 X |
| 3,831,740 | 8/1974 | Pendergast et al. | 206/287 X |
| 3,869,034 | 3/1975 | Thornton, Jr. | 190/111 X |
| 3,933,229 | 1/1976 | Pelavin | 206/287.1 |
| 3,944,032 | 3/1976 | Samhammer et al. | 206/287.1 X |
| 4,081,061 | 3/1978 | Tucker | 190/108 |
| 4,170,282 | 10/1979 | Schwartstein | 206/287.1 |
| 4,206,835 | 6/1980 | Shapiro | 190/108 |
| 4,236,657 | 12/1980 | Brunton | 190/111 X |
| 4,244,453 | 1/1981 | Herz | 190/108 X |
| 4,391,396 | 7/1983 | Brady | 206/287 X |
| 4,420,068 | 12/1983 | Gerch | 190/108 X |
| 4,436,189 | 3/1984 | Baum | 190/108 |
| 4,489,829 | 12/1984 | Myers et al. | 206/287 |
| 4,598,803 | 7/1986 | Ghiassi | 206/287.1 |
| 4,655,343 | 4/1987 | Lane et al. | 206/287.1 |

COMBINATION GARMENT BAG AND PACKING CASE LUGGAGE ARTICLE

Matter enclosed in heavy brackets [ ] appears in the original patent but forms no part of this reissue specification; matter printed in italics indicates the additions made by reissue.

This invention relates to an article of luggage incorporating a garment bag enclosure and a packing case enclosure in an improved and advantageous combination, in which items can be more conveniently transported and, possibly more importantly, used as the destination without encountering the need to unpack the luggage.

BACKGROUND OF THE INVENTION

Garment bags have met with significant acceptance by travelers for many reasons, including their relatively light weight which makes carrying them easier, the ease with which they can be packed with clothes and other items, their flexibility to fit within certain otherwise confining spaces, an ability to carry them into the passenger compartment of commercial passenger aircraft, and others. One of the common disadvantages of garment bags is that it is difficult to confine small items such as shoes and cases for personal toiletry items within the garment bags. Many travelers, rather than leave such smaller items loose in the garment bag, pack them in separate smaller suitcases. However, the necessity to use a separate smaller suitcase makes traveling more difficult because the smaller suitcase must also be carried and accounted for in addition to the garment bag.

Attempts have been made to make garment bags more useful as a single luggage article. An invention described in U.S. application Ser. No. 673,351, titled "Garment Bag With Improved Packing Capability", filed Nov. 23, 1984, now U.S. Pat. No. 4,662,513, which is assigned to the assignee hereof, describes an improved garment bag in which pocket-like enclosures are provided within the bag in which to pack a relatively small number of relatively small items, such as two shoes. Wardrobe luggage cases, which were commonly used many years ago, employed internal compartments in which certain small items could be packed. Some of these internal compartments were even removable after the wardrobe was opened. Wardrobes fell into disfavor and remain in disfavor because they are basically very large, heavy, hard to handle, and they have substantially rigid outer shells or surfaces. Wardrobes are usually more inconvenient for use than the present day large sized hard suitcases. More modern attempts have been made to attach garment bags and garment bag-like enclosures to small cases, such as small suitcases or attache cases. Usually these attempts involve wrapping the garment bag around the sides and bottom of the small case and attaching the ends of the garment bag at the handle of the small case. Other attempts include folding the garment bag-like enclosure in an accordion-like manner and connecting the garment bag enclosure to one side of the small case.

The prior attempts at combining garment bags and small cases have all centered primarily around attempts to make the transportation of the two separate luggage articles more convenient. If any actual increase in convenience has been obtained by such prior arrangements, such increases in convenience seem somewhat insignificant since such arrangements do not seem to enjoy significant popularity among travelers. Certainly it would not appear that these prior attempts at combining garment bags and small cases have resulted in any significant improvements or advancements in making the luggage article more readily usable in a personal toiletry and clothing housing sense, as compared to that level of convenience which two separate luggage articles would themselves achieve.

It is against this general summary of background information that the present invention and the significant improvements available from the present invention have evolved.

SUMMARY OF THE INVENTION

In general terms, the present invention comprises a luggage article which includes a flexible garment bag enclosure and a packing case enclosure. The packing case enclosure is pivotably connected at the packing case enclosure at an interior panel of the garment bag enclosure. The garment bag enclosure is of a length sufficient to fold over the top of and embrace the outside surface of the packing case, when the luggage article is in a state or condition suitable for transportation. Means connects the top and bottom end side walls of the garment bag enclosure and extends beneath the packing case enclosure to maintain the luggage article in the transportation condition. To carry the luggage article in this transportation condition, carrying means is attached, preferably to an exterior panel of the garment bag enclosure, by which the luggage article can be lifted and transported. After transportation of the luggage article has been completed, the garment bag enclosure is longitudinally extended or suspended generally vertically, and the packing case enclosure pivots outward with respect to the garment bag enclosure to provide access to the space within the garment bag enclosure and access to the space within the packing case enclosure. Means extends from the garment bag enclosure to the packing case enclosure to hold the packing case enclosure in the extended orientation for use when the garment bag enclosure is suspended vertically.

Access to the space within the garment bag enclosure and the pivoting function of the packing case enclosure is preferably achieved by disconnecting the inner panel from the garment bag enclosure. The packing case is preferably attached to the inner panel. Access to the space within the packing case is provided through an inside partition piece of the packing case enclosure. The inside partition piece, when the packing case is pivoted to a retracted orientation which it normally occupies during transportation, preferably defines in conjunction with the interior panel, the interior marginal limit of the garment bag enclosure. A pivotable divider panel is preferably included in the inside partition piece to provide the access, and a strap extends to the divider panel to hold it in a partially open position for access to the space within the packing case enclosure. Means may be connected to the divider panel for supporting the lower portions of long garments to curve away from the lower regions of the garment bag enclosure, rather than allow the lower garment portions to wrinkle in an unsupported condition in the garment bag. A carrying shoulder strap can be selectively disconnected as a carrying means and used to support the packing case enclosure in the extended orientation. The means for connecting the garment bag ends to maintain the transportation condition preferably comprises a belt to which a hook member is connected at one end, and at least one hook structure into which the hook member can be connected.

When the luggage article is in the transportation condition, it can be conveniently carried. Preferably the size of the luggage article in the transportation condition is limited so that it may be positioned beneath the seats or as other carryon luggage in a commercial passenger aircraft. When the luggage article is positioned in the use condition with the packing case enclosure in the extended orientation, umimpeded access to the space within the garment bag enclosure and the space within the packing case enclosure is available. Garments can be retained on the hangers in the opened garment bag enclosure without unpacking them into closets. Similarly, other smaller clothing items can be left in the packing case enclosure without unpacking them into drawers of dressers. Many other cooperative advantages result from the particular combination of the garment bag and packing case enclosures provided by the present invention.

The invention is defined more completely in the appended claims. A presently preferred embodiment of the present invention is shown in the accompanying drawings and is described in the following description of a preferred embodiment.

DESCRIPTION OF PREFERRED EMBODIMENT

Figure 1:
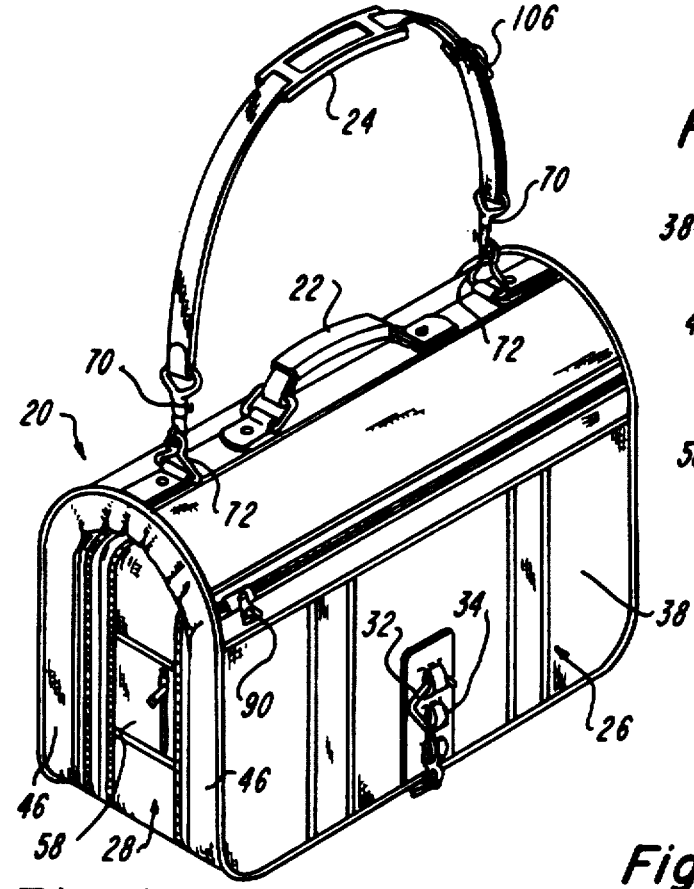
FIG. 1 is a perspective view of the luggage article of the present invention illustrated in a transportation condition.
Figure 2:
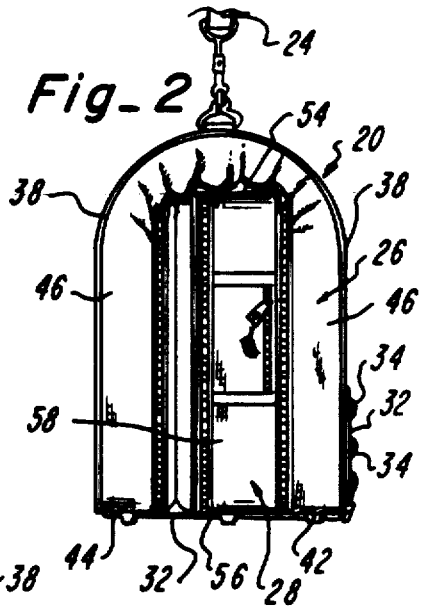
FIG. 2 is a left-hand end elevational view of the luggage article shown in FIG. 1.
Figure 3:
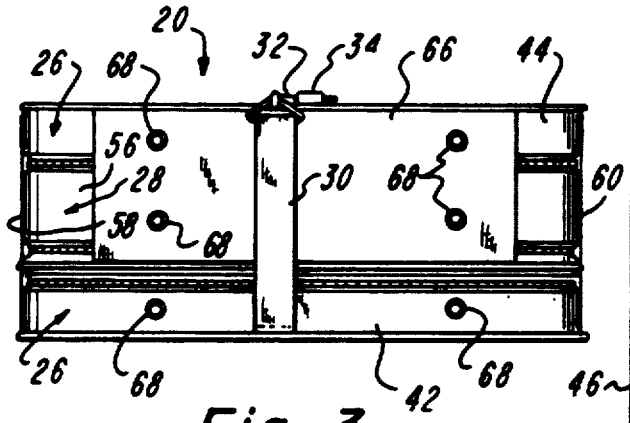
FIG. 3 is a bottom plan view of the luggage article shown in FIGS. 1 and 2.

The presently preferred embodiment of the luggage article of the present invention is referenced 20 in the drawings. As is shown in FIGS. 1, 2 and 3, the luggage article 20 is in a condition or state where it can be easily transported or carried by a carrying handle 22 or a strap 24. The strap 24 is of sufficient length to function as a shoulder support strap. In the transportation condition, a flexible garment back enclosure 26 is folded over the top and sides of a packing case enclosure 28. In order to maintain the garment bag enclosure 26 folded over the packing case enclosure 28, and thereby maintain the luggage article 20 in the transportation condition as shown in FIGS. 1, 2 and 3, connection means in the form of an elongated connector belt 30, a hook member 32 connected to the end of the belt 30, and a series of loop structures 34 are provided. The belt 30 is connected to one longitudinal end of the garment bag enclosure 26 and extends beneath the bottom marginal area or portion of the packing case enclosure 28. The hook 32 connects to one of the loop structures 34 positioned near the other longitudinal end of the garment bag enclosure. The carrying means for the article 20, such as the handle 22 and strap 24, is preferably connected at the exterior of the garment bag enclosure 26 and can thus be used to support the luggage 20 in the transportation condition. The luggage 20 can therefore be transported as an integral unit with all of the convenience of a relatively small or medium sized suitcase, and without the inconvenience of separately carrying and accounting for a garment bag and a small case. Furthermore, the dimensions of the luggage 20 are preferably such that the luggage 20 will fit beneath the seat of a commercial passenger aircraft, thereby allowing the luggage to be carried on to the passenger compartment.

Figure 4:
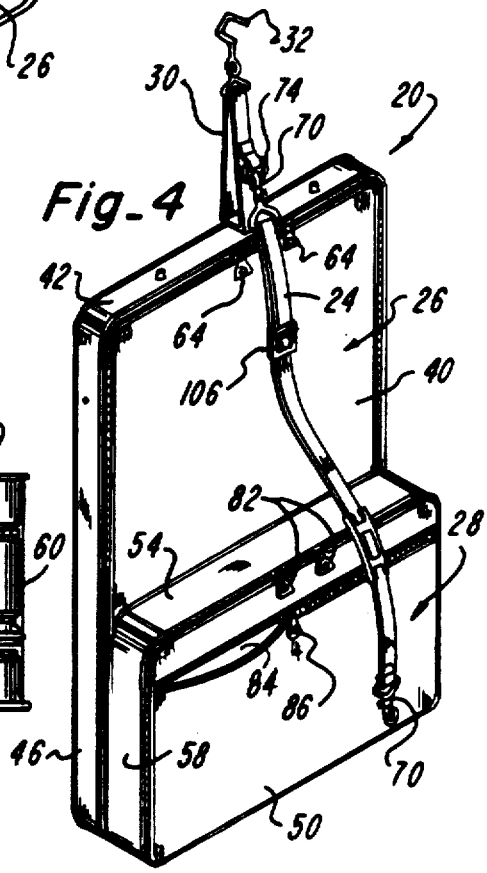
FIG. 4 is a perspective plan view of the luggage article shown in FIG. 1, but with the garment bag enclosure extending longitudinally and vertically with a top end side wall above a lower end side wall and with the packing case enclosure shown in a retracted orientation which it occupies when the luggage article is in the transportation condition.

In order to use the luggage 20, either by packing it or actually using it for personal convenience after the transportation function has been completed, the hook 32 is disconnected from the loop structure 34 (FIG. 1) and the garment bag enclosure 28 is extended longitudinally and preferably vertically suspended as is illustrated in FIG. 4. Generally speaking, the hook 32 will be connected to the upper edge of a door or a closet bar to support the garment bag enclosure in the generally vertical orientation. Initially upon extending the garment bag enclosure as shown in FIG. 4, the packing case enclosure 28 is in a retracted orientation adjoining the garment bag enclosure 26, just as it is when in the transportation condition (FIGS. 1, 2 and 3).

Figure 5:
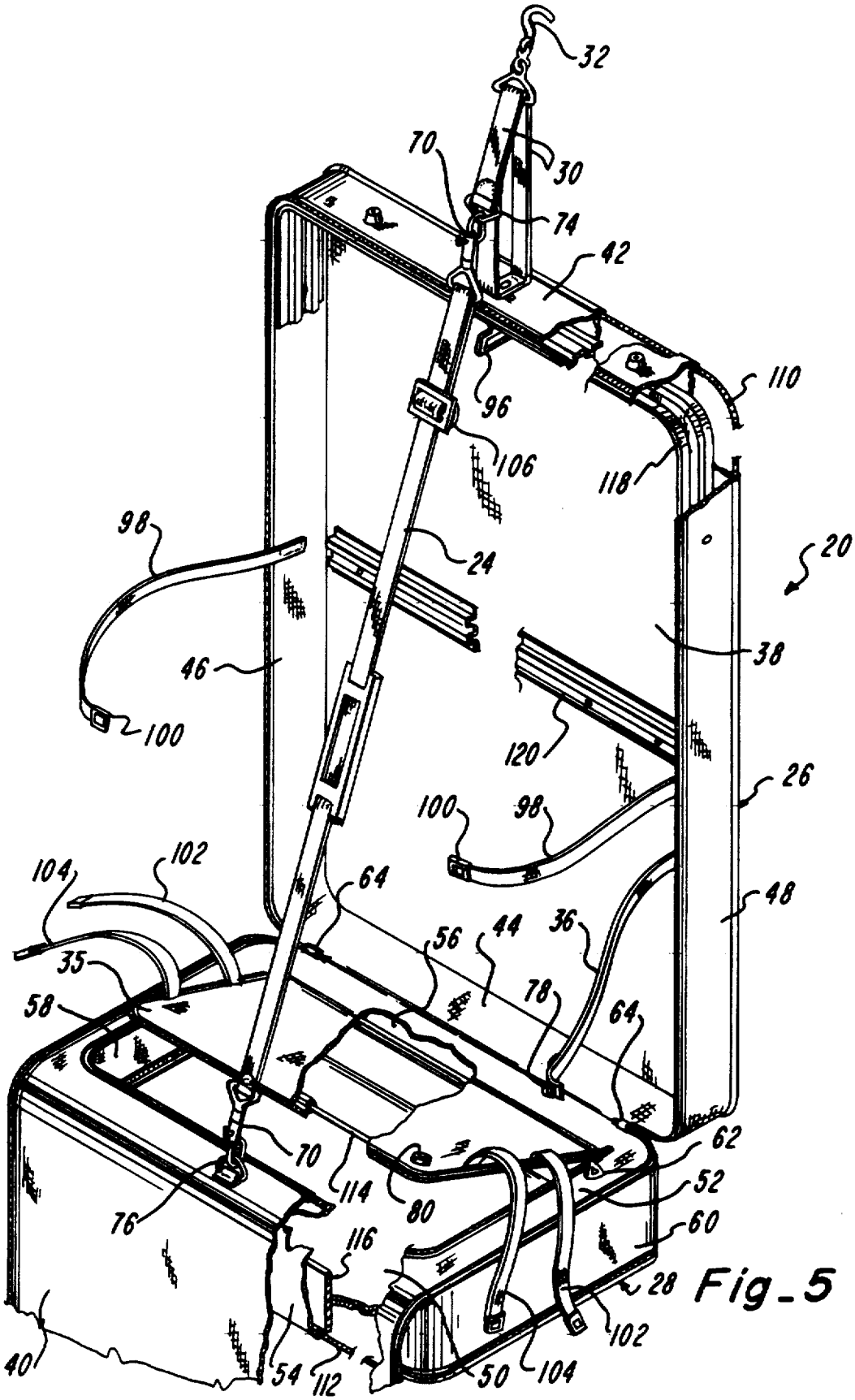
FIG. 5 is an enlarged front perspective view of the luggage article with the garment bag enclosure generally in the orientation shown in FIG. 4, but with an interior panel disconnected and the packing case enclosure shown in an extended orientation which it occupies when the luggage article is in the one condition, and with certain portions broken away for clarity.

The typical use condition of the luggage 20 is illustrated in FIG. 5. The packing case enclosure 28 is pivoted outward into an extended orientation with respect to the garment bag enclosure 26. The shoulder strap 24 has been disconnected from its carrying configuration at the exterior of the garment bag enclosure 26 (FIG. 1) and has been connected between the garment bag enclosure and the packing case enclosure in the manner illustrated in FIG. 5 to support the packing case enclosure 28 in the extended orientation. A pivotable divider panel 35 pivots upward to provide access into the space within the packing case enclosure 28. A strap 36 extends from the garment bag enclosure 26 for the purpose of holding the divider panel 35 in a position to provide access into the space of the packing case enclosure 28.

In the use condition illustrated in FIG. 5, access to the space within the garment bag enclosure 26 is available for packing and unpacking the clothes without interference from the packing case enclosure 28 which has been pivoted to the extended orientation. Similarly, access to the space within the packing case enclosure 28 is available without interference from the garment bag enclosure 26. As a result, the luggage 20 can be used with significant convenience. The garments within the garment bag enclosure 26 can be left suspended therein on their hangers until they are to be worn and the luggage 20 can function in this regard somewhat as a closet. The user need not necessarily unpack the garment bag after arriving at the destination. The smaller items of clothing and other personal toiletry items can be left within the packing case enclosure 28 when it is in the extended position. Again, there is no necessity to unpack these items into drawers of dressers. In essence, the luggage 20 allows the user to maintain his or her clothing and other personal toiletry items in an essential state of readiness for immediate transportation should the need arise, and the luggage 20 avoids expending the extra effort in packing and unpacking the luggage after arriving at and leaving from the destination.

The details of the structural elements and their cooperation and function in achieving the improvements and advantages of the luggage 20 can now be more fully described. The garment bag enclosure 26 includes an exterior panel 38 having a generally rectangular configuration in which the longer dimension extends substantially in the direction of the length of the garment bag enclosure, which is vertical as is shown in FIGS. 4 and 5. An interior panel 40 is also part of the garment bag enclosure 26 and is spaced from the exterior panel 38 by side walls to define the interior space of the garment bag enclosure 26. The side walls include a top end transverse or horizontal side wall 42, a bottom end transverse or horizontal side wall 44 and a left-hand longitudinal or vertical side wall 46 and a right-hand longitudinal or vertical side wall 48. The side walls may be provided by means of separate pieces connected to the panels as shown or they may be provided by means of joining the appropriate edges of the panels in the well known "envelope" construction which is not shown. The packing case enclosure 26 includes an outside marginal or partition piece 50, an inside marginal or partition piece 52 and border pieces which space the outside and inside partition pieces from one another to define the interior space of the packing case enclosure 28. The border pieces include a top border piece 54, a bottom border piece 56, a left border piece 58, and a right border piece 60.

As is shown in FIG. 5, the divider panel 35 forms a part of the inside partition piece 52. A zipper 62 serves as means for attaching the divider panel 35 as a part of the inside partition piece 52. The zipper 62 also serves as means for detaching the free edges of the divider panel 35 from the remaining portions of the inside partition piece 52, to allow the divider panel 35 to hinge at an edge location adjoining the bottom border piece 56 and the bottom side wall 44. This hinging or pivoting function is achieve by means of the flexibility of the material from which the divider panel 35 and inside partition piece 52 are formed, for example. Permanently connected to and extending upwardly from the inside partition piece 52 is the interior panel 40 of the garment bag enclosure. This permanent connection is achieved by means joining the interior panel 40 and the packing case enclosure, for example sewing. Thus, the inside partition piece 52 and the attached divider panel 35 also function as a part of the interior panel 40 in enclosing the space within the garment bag enclosure 26.

To operatively disconnect the packing case enclosure 28 from the garment bag enclosure 26, thereby allowing the packing case enclosure 28 to pivot to the extended position in which the inside partition piece 52 extends at a predetermined intersecting angle with the exterior panel 38 as shown in FIG. 5, and thereby also providing access to the space within the garment bag enclosure 26, at least one and preferably two zippers 64 are opened from the state shown in FIG. 4 to the state shown in FIG. 5. The zippers 64 extend around the periphery of the interior panel 40 and the side walls 42, 46 and 48, but do not extend between the bottom side wall 44 and the packing case enclosure 28 at its bottom border piece 56. An integral flexible connection of the material extends between the garment bag enclosure 26 and the packing case enclosure 28 at the bottom side wall 44 and bottom border piece 56. A doubler panel 66 (FIG. 3) extends between the bottom side wall 44 and the bottom border piece 56 at the exterior surface of the luggage 20. The doubler panel 66 is also flexible but provides added strength for allowing the packing case enclosure to pivot to the extended orientation. The packing case enclosure 28 is thereby permanently connected to the garment bag enclosure 26, and the packing case enclosure 28 is also able to pivot to the extended orientation. The teeth for the zippers 64 also extend along the left and right border pieces 58 and 60 to allow the zipper to hold the packing case enclosure 28 in the retracted orientation (FIG. 4) when the zippers 64 are closed and allow the packing case enclosure 28 to move to the extended orientation (FIG. 5) when the zippers 64 are opened. The zippers 64 are thus one example of means for selectively connecting the packing case enclosure to the lower portions of the left and right side walls of the garment bag enclosure.

Support feet 68 (FIG. 3) are attached to the doubler panel 66 and to the top side wall 42. The support feet 68 serve as means for supporting the luggage 20 from a horizontal surface when in the transportation condition as is shown in FIG. 2.

To enable the shoulder strap 24 to also function advantageously as means extending between the garment bag enclosure 26 and the packing case enclosure 28 for the purpose of holding the packing case enclosure in the extended orientation as shown in FIG. 5, means such as latching devices 70 are connected at each end of the shoulder strap 24. The latching devices 70 are connected to rings 72 attached at the exterior panel 38 of the garment bag enclosure when the strap 24 is used as a shoulder carrying strap, as is illustrated in FIG. 1. The latching devices 70 are disconnected from the rings 72 (FIG. 1) and are connected between a ring 74 attached to the belt 30 and a ring 76 attached near the top border piece 54 at the inside partition piece 52 of the packing case enclosure. The location of the ring 74 positions the latching device 70 at the upper end of the shoulder strap 24 near the top side wall 42. The rings 72, 74 and 76 are conventional rigid wire items attached by conventional means such as by flaps sewn into the material of the luggage 20.

In order to hold the divider panel 35 at the angle with respect to the inside partition piece 52 and to thereby provide access to the space within the packing case enclosure 28, the strap 36 includes a snap 78 at its outside end. The snap 78 connects to a fitting 80 formed at the upper free edge of the divider panel 35.

Figure 8:
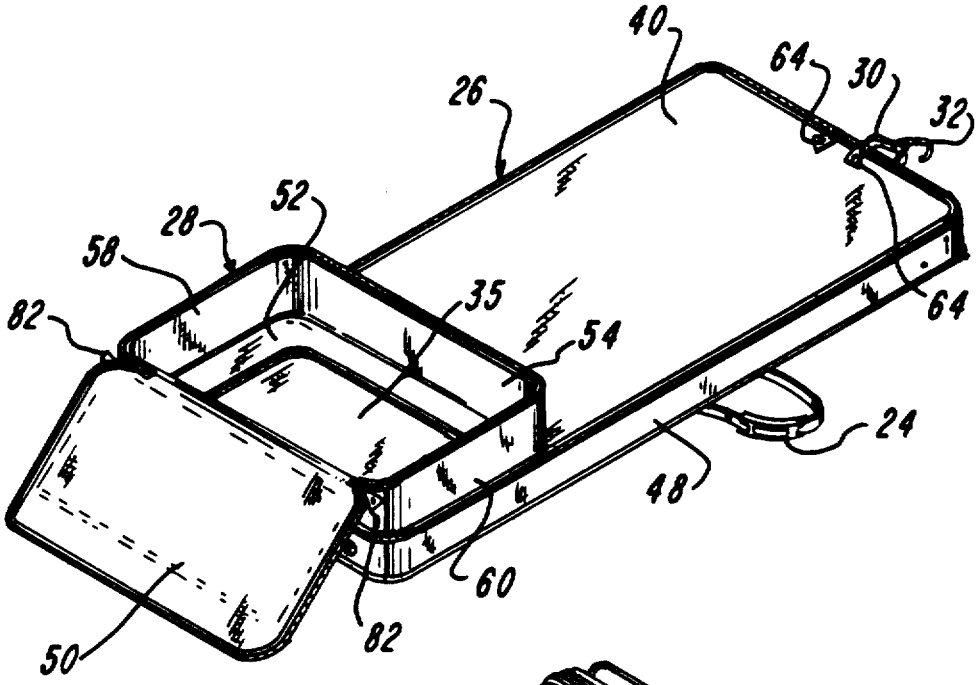
FIG. 8 is a perspective view of the luggage article with the garment bag enclosure extending longitudinally and horizontally and with an outside partition piece of the packing case enclosure disconnected from border pieces of the packing case enclosure and pivoted back to reveal and provide access to the space within the packing case enclosure.

In order to provide access to the space within the packing case enclosure 28 when the packing case enclosure is not in the extended orientation, the outside partition piece 50 is pivotably connected to the packing case enclosure as is illustrated in FIGS. 4 and 8. The outside partition piece 50 is pivotably and permanently connected at one edge to a border piece, for example, the bottom border piece 56. Zippers 82 extend around the left and right border pieces 58 and 60 and the top border piece 54, and serves as examples of means which allow the outside partition piece 50 to be selectively attached to the border pieces as shown in FIG. 4 or detached from the border pieces and pivoted to provide access to the interior space of the garment bag enclosure 28 as is shown in FIG. 8.

Figure 7:
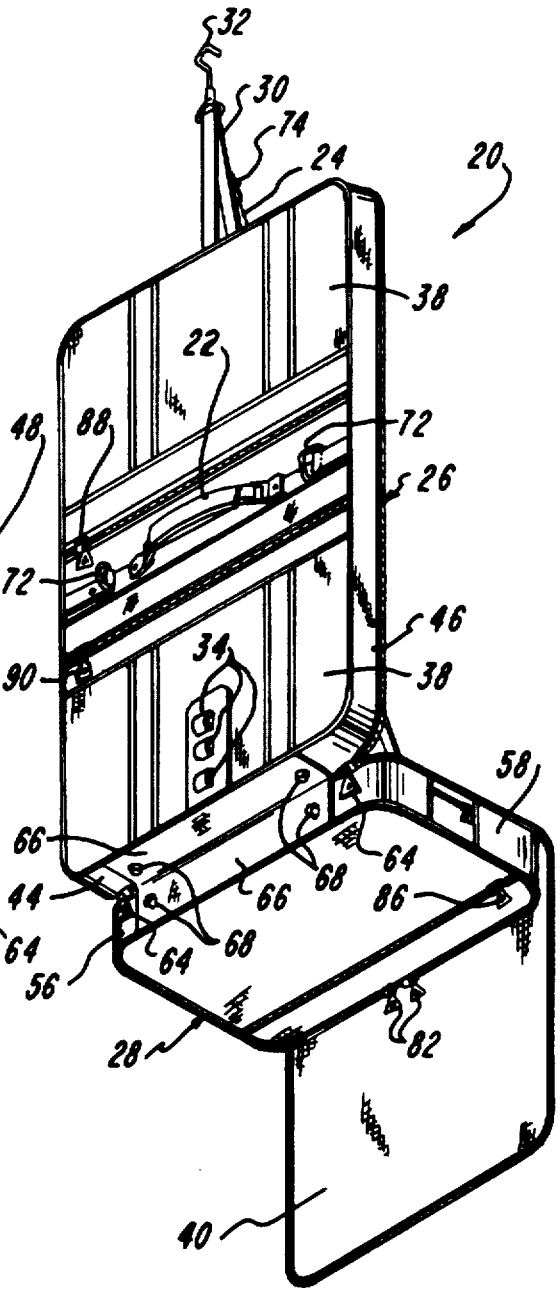
FIG. 7 is a rear perspective view of the luggage article shown in FIG. 6.

A pocket 84 may be formed as a part of the outside partition piece 50 by use of multiple layers of fabric, and the pocket may be closed at its upper end by a zipper 86, in the usual manner. Similarly, exterior pockets may be formed in the exterior panel 38 of the garment bag enclosure, and such pockets closed by zippers 88 and 90, as shown in FIG. 7.

Figure 6:
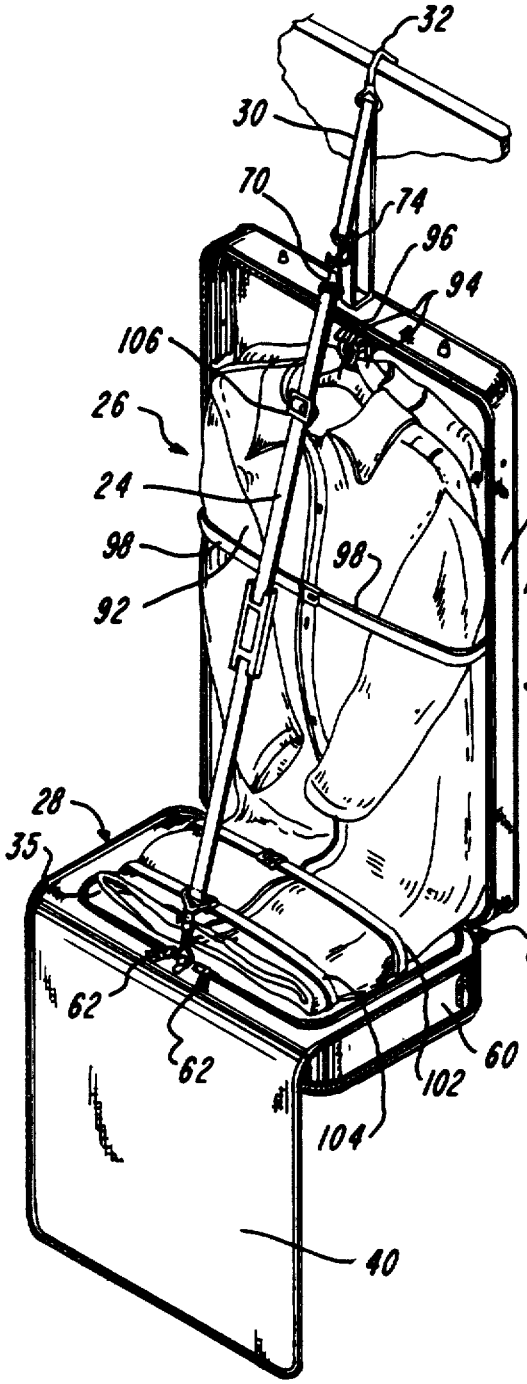
FIG. 6 is a perspective view similar to that shown in FIG. 5, but illustrating garments on hangers packed within the garment bag enclosure.

With the packing case enclosure in the extended orientation, as shown in FIGS. 5 and 6, garments 92 on hangers 94 can easily be packed or loaded into the space within the garment bag enclosure 26. A connecting device known as a trolley 96 (FIG. 5) is connected to the top side wall 42. The hooked ends of the hangers 94 fit into the trolley 96 and allow the garments 92 to be suspended from the hangers and extend downward in the space within the garment bag toward the bottom side wall 44 (FIG. 5). To aid in maintaining the garments 92 in position within the garment bag, a middle belt 98 is connected to the side walls 46 and 48. Connector portions 100 at the ends of the belt 98 allow the belt 98 to be fastened over approximately the mid-section of the garments 92. For those long garments 92 which extend in length greater than the length of the garment bag enclosure 26, the lower garment portions can be attached to the divider panel 35 by use of belts 102 and 104. The belts 102 and 104 include connecting devices at their ends to fit over the lower portions of the long garments as shown in FIG. 6. By connecting the lower portions of the long garments with the belts 102 and 104, the lower portions of long garments can be held above the bottom side wall 44 of the garment bag enclosure. The lower portions of the longer garments are folded over or doubled back when the packing case enclosure is in the retracted orientation (FIG. 4). The lower portions of the longer garments thereby curve upward away from the bottom of the packing case enclosure and are not allowed to fall into heaps where they become wrinkled, as is typical in many garment bags. The advantages of holding the lower portions of longer garments off of the bottom of garment bags are more completely described in the aforementioned U.S. patent application Ser. No. 673,351.

The luggage 20 can be conveniently packed and unpacked when the garment bag enclosure 26 is in a horizontally extended position as is shown in FIG. 8, and the packing case enclosure 28 is also in a horizontal extended orientation. In this condition of use, which is not specifically illustrated, the packing case enclosure extends beyond the bottom side wall of the garment bag enclosure, and the divider panel 35 faces upward. Garments on hangers can be packed into the space within the garment bag enclosure by laying them horizontally into the garment bag enclosure. Articles are packed into the packing case enclosure by lifting the divider panel 35 to provide access into the packing case enclosure. The long garments, such as those shown in FIG. 6, can also be packed in a similar manner, by placing the lower portions of the long garments on top of the divider panel 35 and connecting the belts 102 and 104 (FIG. 5).

By providing access to the interior space of the packing case enclosure through either the pivoting divider panel 35 or the outside partition piece 50, the packing case enclosure can be packed or unpacked when it is either in the retracted orientation as shown in FIG. 8 or in the extended orientation as shown in FIG. 5 or as described in the above paragraph.

Depending upon the thickness of the garment bag enclosure when it is packed, adjustments are available for maintaining the luggage 20 in the transportation condition as shown in FIG. 1. As is shown in FIG. 7, a plurality of loop structures 34 are arranged in a linear fashion. The hook member 32 is inserted through the appropriate one of the loop structures 34 to firmly hold the garment bag enclosure around the packing case enclosure in the transportation condition.

The length of the shoulder strap 24 is also adjustable, by a conventional connector 106, which allows the strap to fold back on itself in the usual manner. The user can adjust the length of the shoulder strap 24 for convenience in carrying the luggage 20 in the transportation condition. The length of the shoulder strap 24 can also be adjusted when it is used as a means for holding the packing case enclosure in the extended orientation as shown in FIG. 5, in order to obtain a desired degree of extended orientation.

Figure 9:
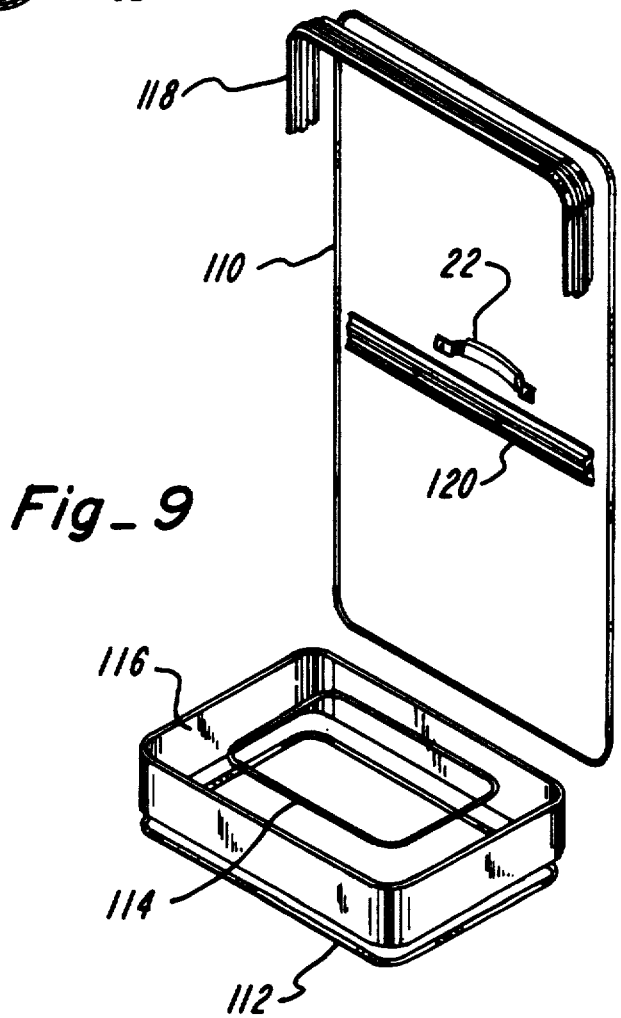
FIG. 9 is a perspective view of certain structural elements incorporated within the luggage article of the present invention.

In order to provide support and rigidity for the flexible, preferably fabric, marginal components of the garment bag and packing case enclosures, certain stiffening elements are provided, as is illustrated in FIGS. 5 and 9. These stiffening elements generally include a flexible wire-like bead 110 which extends around the exterior panel 38 of the garment bag enclosure, a rigid wire bead 112 which extends around the outside partition piece 50 of the packing case enclosure and another bead 114 which extends around the periphery of the divider panel 35. A relatively semi-rigid thin fabric frame 116 is enclosed within the border pieces of the packing case enclosure. A relatively rigid top end reinforcement 118 is included within the top end side wall 42 and a portion of the adjoining vertical side walls 46 and 48 of the garment bag enclosure. The reinforcement 118 has connected thereto, the belt 30 and the trolley 96 to enable the distribution of forces over the luggage 20 when it is in the use condition. The frame 116 of the packing case enclosure is also useful in maintaining the packing case enclosure in the extended orientation for use, since the ring 76 is connected adjoining it. A relatively rigid carrying support 120 extends transversely with respect to the length of the exterior panel of the garment bag enclosure. The carrying support 120 has connected thereto the carrying handle 22 and the rings 72 (FIG. 1) to which the shoulder strap 24 is connected. The rings 72 are connected at positions adjoining the outer ends of the support 120 at the vertical side walls 46 and 48. Accordingly, the support 120 distributes the force necessary to lift the luggage 20 in the transportation condition over a substantial area of the exterior panel of the garment bag enclosure.

With the exception of the various components mentioned, the marginal elements of the luggage will normally be formed of fabric, and the fabric pieces will be sewn together in the usual manner in the construction of the luggage 20.

The combination of the garment bag enclosure with the packing case enclosure creates a single piece of the luggage 20 which is advantageously used for transportation garments and smaller items. Both the packing case enclosure and the garment bag enclosure cooperate with one another to make the luggage effective to house personal toiletry and clothing items, rather than requiring unpacking of the luggage. Other and numerous specific advantages and improvements also result.

A preferred embodiment of the present invention has been shown with a degree of specificity. It should be understood, however, that the specificity of this description has been made by way of preferred example. The invention itself is defined by the scope of the claims appended hereto.

The invention claimed is:

1. A luggage article, comprising:

a flexible garment bag enclosure comprising an exterior elongated panel, and interior elongated panel, and means providing side walls between the interior and exterior panels the interior and the exterior panels having their longer dimensions oriented generally longitudinally, the side walls including a top transverse end side wall, a bottom transverse end side wall, a left longitudinal side wall and a right longitudinal side wall, the panels and side walls defining a space within the garment bag enclosure for receiving garments on hangers attached near the top end side wall; and a packing case enclosure including means for permanently connecting the packing case enclosure to the interior panel and means for pivotably connecting the packing case enclosure to the bottom end side wall and means for selectively connecting the packing case enclosure to the lower portion of the left and right longitudinal side walls;

the garment bag enclosure extending sufficiently longitudinally to fold over and substantially embrace a top border piece and an outside partition piece of the packing case enclosure when in a transportation condition, the top end and the bottom end side walls being oriented generally in alignment with a bottom border piece of the packing case enclosure when in the transportation condition.

2. A luggage article as defined in claim 1 wherein:

said means for selectively connecting the packing case enclosure comprises means for selectively attaching the interior panel to at least one of the side walls and for selectively detaching the interior panel from the one side wall; and said means for pivotably connecting the packing case enclosure allows a pivotable movement from a retracted orientation in which the packing case enclosure adjoins the space within the garment bag enclosure to an extended orientation in which the packing case enclosure extends away from the garment bag enclosure to allow access to the space within the garment bag enclosure without interference from the packing case enclosure, the packing case enclosure being in the retracted orientation when the luggage article is in the transportation condition.

3. A luggage article as defined in claim 2 further comprising means extending from the garment bag enclosure to the packing case enclosure for supporting the packing case enclosure in the extended orientation when the garment bag enclosure is positioned generally vertically with the top end side wall above the bottom end side wall.

4. A luggage article as defined in claim 2 wherein the packing case enclosure also includes an inside partition piece which extends generally in alignment with the interior panel when the interior panel is attached to the one side wall and the packing case enclosure is in a retracted orientation.

5. A luggage article, comprising:

a flexible garment bag enclosure comprising an exterior elongated panel, and interior elongated panel, and means providing side walls between the interior and exterior panels, the interior and the exterior panels having their longer dimensions oriented generally longitudinally, the side walls including a top transverse end side wall, a bottom transverse end side wall, a left longitudinal side wall and a right longitudinal side wall, the panels and side walls defining a space within the garment bag enclosure for receiving garments on hangers attached near the top end side wall; and a packing case enclosure comprising an inside partition piece, an outside partition piece and border pieces extending between the inside and outside partition pieces to define a space within the packing case enclosure adapted for receiving items to be individually packed, means for pivotably connecting the packing case enclosure relative to the bottom end side wall to allow pivotable movement from an retracted orientation in which the inside partition piece extends generally in adjacency with the garment bag space and to an extended orientation in which the inside partition piece extends generally at a predetermined intersecting angle with respect to the exterior elongated panel;

the predetermined intersecting angle in the extended orientation allowing access to the garment bag and packing case spaces without substantial interference from the packing case enclosure and the garment bag enclosure, respectively; and means extending between the garment bag enclosure and the packing case enclosure for supporting the packing case enclosure in the extended orientation when the garment bag enclosure extends generally vertically with the top end side wall above the bottom end side wall.

6. A luggage article as defined in claim 5 further comprising means in the outside partition piece for providing selective access into the space within the packing case enclosure.

7. A luggage article as defined in claim 5 wherein the garment bag enclosure extends sufficiently longitudinally to fold over and substantially embrace a top border piece and the outside partition piece of the packing case enclosure when the packing case enclosure is in a retracted orientation and when the luggage article is in a transportation condition.

8. A luggage article, comprising:

a flexible garment bag enclosure comprising an exterior elongated panel, and interior elongated panel, and means providing side walls between the interior and exterior panels, the interior and the exterior panels having their longer dimensions oriented generally longitudinally, the side walls including a top transverse end side wall; a bottom transverse end side wall, a left longitudinal side wall and a right longitudinal side wall, the panels and side walls defining a space within the garment bag enclosure for receiving garments on hangers attached near the top end side wall, and a packing case enclosure including means for permanently connecting the packing case enclosure to the interior panel at a location adjoining and above the bottom end side wall;

the garment bag enclosure extending sufficiently in length to fold over and substantially embrace all outside surfaces of the packing case enclosure except a bottom portion of the packing case enclosure, the bottom portion of the packing case enclosure adapted to rest on a horizontal surface when the luggage article is in a transportation condition;

carrying means connected to the exterior panel at an operative location in the center region between the top and bottom end side walls by which to carry the luggage article when in the transportation condition; and connection means for selectively extending between the bottom end side wall and the top end side wall and under the bottom portion of the packing case enclosure to maintain the article in the transportation condition.

9. A luggage article as defined in claim 8 further comprising:

means for pivotably connecting the packing case enclosure to allow pivotable movement from a retracted orientation in which the packing case enclosure adjoins the space within the garment bag enclosure to an extended orientation in which the packing case enclosure extends away from the garment bag enclosure to allow access to the space within the garment bag enclosure without interference from the packing case enclosure, the packing case enclosure being in the retracted orientation when the luggage article is in the transportation condition.

10. A luggage article as defined in claim 9 further comprising means extending from the garment bag enclosure to the packing case enclosure for supporting the packing case enclosure in the extended orientation when the garment bag enclosure is positioned generally vertically with the top end side wall above the bottom end side wall.

11. A luggage article as defined in claim 9 wherein the packing case enclosure also includes an inside partition piece which extends generally in alignment with the interior panel when the interior panel is attached to the one side wall and the packing case enclosure is in a retracted orientation.

12. A luggage article as defined in claim 8 wherein the connection means further comprises an elongated member, a first connector device connected to one end of the elongated member, and a second connector device connected to the exterior panel, the first and second connector devices adapted to interconnect with one another.

13. A luggage article as defined in claim 12 wherein the first connector device comprises a hook member, the second connector device comprises at least one loop structure, and the hook member is adapted for fitting into the loop structure.

14. A luggage article as defined in claim 13 wherein the second connector device comprises a series of loop structures arranged in a predetermined order to allow a corresponding different number of positions at which the hook member can be connected to achieve adjustment.

15. A luggage article as defined in claim 13 wherein the hook member is also adapted for suspending the luggage article with the garment bag enclosure extending vertically with the top end side wall above the bottom end side wall.

16. A luggage article as defined in claim 12 wherein the first connector device includes means for suspending the luggage article with the garment bag enclosure extending vertically with the top end side wall above the bottom end side wall.

17. A luggage article, comprising:

a flexible garment bag enclosure comprising an exterior elongated panel, and interior elongated panel, and means providing side walls between the interior and exterior panels, the interior and the exterior panels having their longer dimensions oriented generally longitudinally, the side walls including a top transverse end side wall, a bottom transverse end side wall, a left longitudinal side wall and a right longitudinal side wall, the panels and side walls defining a space within the garment bag enclosure for receiving garments on hangers attached near the top end side wall; and a packing case enclosure including means for pivotably connecting the packing case enclosure to the garment bag enclosure to pivot from a retracted orientation in which the packing case enclosure adjoins the space within the garment bag enclosure to an extended orientation in which the packing case enclosure extends away from the garment bag enclosure to allow access to the space within the garment bag enclosure without interference from the packing case enclosure, the packing case enclosure comprising an inside partition piece, and outside partition piece and border pieces extending between the inside and outside partition pieces to define a space within the packing case enclosure adapted for receiving items to be individually packed;

the inside partition piece includes means for allowing selective access through the inside partition piece to the space within the packing case enclosure when the packing case enclosure is in the extended orientation; and the outside partition piece includes means for providing selective access through the outside partition piece to the space within the packing case enclosure when the packing case enclosure is in the retracted orientation.

18. A luggage article as defined in claim 17 further comprising means extending from the garment bag enclosure to the packing case enclosure for supporting the packing case enclosure in the extended orientation when the garment bag enclosure is positioned generally vertically with the top end side wall above the bottom end side wall.

19. A luggage article as defined in claim 17 wherein the means for allowing selective access through the inside partition piece to the space within the packing case enclosure comprises a divider panel pivotably connected at a location adjoining a border piece.

20. A luggage article as defined in claim 19 wherein the divider panel is pivotably connected adjacent to the bottom end side wall.

21. A luggage article as defined in claim 19 further comprising means extending from the garment bag enclosure to selectively connect to the divider panel and operative for holding the divider panel in a position in which access to the space within the packing case enclosure is provided and to simultaneously allow access to the space within the garment bag enclosure when the packing case enclosure is in the extended position.

22. A luggage article as defined in claim 20 wherein the divider panel includes means connected on the side facing the garment bag enclosure and operative for holding the bottom portions of garments within the garment bag enclosure of sufficient length to extend from the hangers at the top end side wall along the garment bag enclosure to the bottom end side wall in a manner to curve away from the bottom end side wall against the inside divider panel.

23. A luggage article as defined in claim 17 wherein the garment bag enclosure extends sufficiently longitudinally to fold over and substantially embrace a top border piece and the outside partition piece of the packing case enclosure when the packing case enclosure is in a retracted orientation and when the luggage article is in a transportation condition.

24. A luggage article as defined in claims 3, 5 10 or 18 wherein the means for supporting the packing case enclosure in the extended orientation comprises an elongated member and means for selectively connecting the elongated member to extend generally from a first location adjoining a border piece of the packing case enclosure to a second location adjoining a side wall of the garment bag enclosure.

25. A luggage article as defined in claim 24 wherein the elongated member includes an elongated strap and means operative at the ends of the strap for selectively connecting the strap to the exterior panel.

26. A luggage article as defined in claim 25 wherein the elongated strap is of sufficient length to function as a shoulder carrying strap for the luggage article when attached to the exterior panel.

27. A luggage article as defined in claim 26 further comprising means for adjusting the length of the elongated strap.

28. A luggage article as defined in claims 5, 4 or 11 wherein the inside partition piece includes means for allowing selective access through the inside partition piece to the space within the packing case enclosure when in the extended orientation.

29. A luggage article as defined in claim 28 wherein the means for allowing selective access through the inside partition piece to the space within the packing case enclosure comprises a divider panel pivotably connected at a location adjoining a border piece.

30. A luggage article as defined in claim 29 wherein said location is adjacent to the bottom end side wall.

31. A luggage article as defined in claim 29 further comprising means extending from the garment bag enclosure to selectively connect to the divider panel and operative for holding the divider panel in a position in which access to the space within the packing case enclosure is provided and to simultaneously allow access to the space within the garment bag enclosure when the packing case enclosure is in the extended position.

32. A luggage article as defined in claim 30 wherein the divider panel includes means connected on the side facing the garment bag enclosure and operative for holding the bottom portions of garments within the garment bag enclosure of sufficient length to extend from the hangers at the top end side wall along the garment bag enclosure to the bottom end side wall in a manner to curve away from the bottom end side wall against the inside divider panel.

33. A luggage article as defined in claim 6 or 17 wherein said means in the outside partition piece for providing selective access into the space within the packing case enclosure further comprises:

means pivotably connecting substantially the whole outside partition piece to one border piece, and means for selectively attaching the outside partition piece to the other border pieces and for selectively detaching the outside partition piece from the other border pieces.

34. A luggage article as defined in claim 1, 7 or 22 further comprising means for carrying the luggage article when in the transportation condition, the carrying means being connected to the exterior panel at an operative location between the top end and bottom end side walls.

35. A luggage article as defined in claim 34 wherein the carrying means comprises an elongated strap connected to the exterior panel at locations adjacent the side walls.

36. A luggage article as defined in claim 35 wherein the elongated strip is disconnectable at its ends from the locations at which it is connected.

37. A luggage article as defined in claim 36 wherein the elongated strap is of length sufficient to function as a shoulder carrying strap for the luggage article when in the transportation condition.

38. A luggage article as defined in claim 37 further comprising means for adjusting the length of the elongated strap.

39. A luggage article as defined in claims 1 or 7 further comprising support feet means connected at a bottom portion of the packing case enclosure for supporting the luggage article on a horizontal surface when in the transportation condition.

40. A luggage article as defined in claims 1, 7, or 23 further comprising connection means for retaining a portion of the interior panel near the top end side wall adjoining the outside partition piece when the luggage article is in the transportation condition.

41. A luggage article as defined in claim 40 wherein said connection means comprises an elongated member extending from the bottom end side wall under a bottom portion of the packing case enclosure to the top end side wall.

42. A luggage article as defined in claim 41 wherein the connection means further comprises a first connector device connected to one end of the elongated member and a second connector device connected to the exterior panel, the first and second connector devices adapted to interconnect with one another.

43. A luggage article as defined in claim 42, wherein the first connector device comprises a hook member, the second connector device comprises at least one loop structure, and the hook member is adapted for fitting into the loop structure.

44. A luggage article as defined in claim 43 wherein the second connector device comprises a series of loop structures arranged in a predetermined order to allow a corresponding different number of positions at which the hook member can be connected to achieve adjustment.

45. A luggage article as defined in claim 43 wherein the hook member is also adapted for suspending the luggage article with the garment bag enclosure extending vertically with the top end side wall above the bottom end side wall.

46. A luggage article as defined in claim 42 wherein the first connector device includes means for suspending the luggage article with the garment bag enclosure extending vertically with the top end side wall above the bottom end side wall.

*47. A luggage article, comprising:*

*a flexible bag enclosure comprising elongated panels including at least a flexible exterior panel and having an interior space within which to pack and hold garments on hangers:*

*a packing case enclosure comprising inside and outside partition pieces and a stiffening element supporting the periphery of at least one of the partition pieces and having an interior space within which to pack relatively smaller items;*

*means for pivotably connecting the garment bag and packing case enclosures for positioning the two enclosures in a use orientation while pivotably connected relative to one another wherein the interior spaces of each enclosure may be accessed without substantial interference from the other enclosure, and for positioning the two enclosures in a transportation orientation wherein the garment bag enclosure folds over the packing case enclosure embraces at least the outside partition piece;*

*means for holding the garment bag enclosure in the transportation orientation to create an integral unit capable of being supported from the exterior panel of the garment bag enclosure; and*

*means for supporting the packing case enclosure at an angle extending from the vertical when the garment bag enclosure is in a vertical orientation during use.*

*48. A luggage article as defined in claim 47, further comprising:*

*carrying means connected to the exterior panel of the garment bag enclosure for supporting the article as the integral unit.*

*49. A luggage article as defined in claim 47, wherein:*

*said pivotably connecting means includes zipper means.*

*50. A luggage article as defined in claim 47, wherein:*

*in the transportation orientation, the interior spaces of the garment bag enclosure and packing case enclosure are adjacent one another; and*

*in the use orientation, the interior spaces of the garment bag enclosure and the packing case are separated from one another.*

*51. A luggage article as defined in claim 47, wherein:*

*said supporting means extends between the garment bag enclosure and the packing case enclosure.*

*52. A luggage article as defined in claim 51, further comprising:*

*means in the inside partition piece for allowing selective access to the interior space within the packing case enclosure.*

*53. A luggage article as defined in claim 52, wherein:*

*said means for allowing selective access comprises a pivotable panel.*

*54. A luggage article as defined in claim 47, wherein:*

*said holding means comprises connection means extending between longitudinally opposite ends of the garment bag enclosure and beneath the lower exterior portion of the packing case enclosure, when in the transportation orientation.*

*55. A luggage article as defined in claim 47, wherein:*

*the garment bag enclosure extends in a longitudinal dimension; and further comprising:*

*means connected to the packing case enclosure and operative with respect to the bottom portions of relatively long garments packed within the garment bag enclosure which are of sufficient length to extend beyond the length of the interior space of the garment bag enclosure, for retaining the bottom portions of the long garments in a reverse curve from one end of the garment bag enclosure against the inside partition piece of the packing case enclosure.*

*56. A luggage article as defined in claim 47, wherein:*

*the stiffening element of the packing enclosure is relatively less flexible in the longitudinal dimension of the elongated panels of the garment bag enclosure, then the garment bag enclosure is flexible in the same dimension when in the transportation orientation.*

* * * * *